United States Patent [19]
Draganoff

[11] Patent Number: 5,359,651
[45] Date of Patent: Oct. 25, 1994

[54] TELEPHONE DIALLER WITH FAST ACCESS TELEPHONE DIRECTORY AND "CALL BACK" FEAURE

[76] Inventor: Georgi H. Draganoff, 565 Serbourne St., Apt. 1111, Toronto Ontario M4X 1W7, Canada

[21] Appl. No.: 878,987

[22] Filed: May 6, 1992

[51] Int. Cl.⁵ ............................................. H04M 1/00
[52] U.S. Cl. .................................. 379/354; 379/355; 379/98
[58] Field of Search ................... 379/354, 355, 98, 399

[56] References Cited

U.S. PATENT DOCUMENTS

| | | | |
|---|---|---|---|
| 4,511,764 | 4/1985 | Nakayama et al. | 379/354 |
| 4,532,378 | 7/1985 | Nakayama et al. | 379/354 |
| 4,800,582 | 1/1989 | D'Agosto, III et al. | 379/354 |
| 4,839,919 | 6/1989 | Borges et al. | 379/354 |
| 4,982,423 | 1/1991 | Muroi | 379/354 |
| 5,067,150 | 11/1991 | Satomi et al. | 379/354 |
| 5,163,050 | 11/1992 | Cromack | 379/98 |

Primary Examiner—James L. Dwyer
Assistant Examiner—J. M. Saint-Surin

[57] ABSTRACT

An advanced telephone dialler has been described, incorporating a fast retrieval and dial telephone directory. The system simplifies the use of the telephone directory by using a single sliding or rotary key for scanning and selection of the name and number to be dialed and one button for speed dialling of the selected number. The name and telephone number of the selected person are simultaneously displayed on a character display and a normal telephone keypad has been used for entering both letters for the name and digits for the number into telephone directory's memory. A short cut dialling has been also provided by simply using the sequential order number of the person to be dial led from the telephone directory's memory. An option has been provided for checking the incoming calls numbers with the telephone directory of the system and displaying the name of the calling person and its number if they have been found in directory. The application is targeted for heavy traffic business phones, cellular phones and as a part of an office or home automation system.

14 Claims, 3 Drawing Sheets

ND "CALL BACK"
TELEPHONE DIALLER WITH FAST ACCESS TELEPHONE DIRECTORY AND "CALL BACK" FEAURE

BACKGROUND OF THE INVENTION

There are many different telephone sets with autodialling and stored telephone directory. They normally have some kind of memory for storing preselected and frequently called telephone numbers and usually every one of those numbers has a corresponding push-button. This kind of arrangement is very inconvenient if a large number of telephone numbers is stored as far as a separate push-button is required for each number. Also, additional information such as name and/or address can not be conveniently associated with push-buttons.

To assist in identifying the telephone numbers that are stored in the respective memory location, paper tabs, or inserts are juxtaposed the respective keys, and it is expected that the user will write onto each paper tab the name of the individual whose telephone number is stored in the associated memory locations.

It has been proposed in Can. Pat. 1,266,930 (pg.1, ln.24..):".. a hybrid alphanumeric directory comprising a portable note book having a plurality of bound pages, which can be opened to expose a desired page, each page having a plurality of writing areas in the same relative positions where alpha-numeric information can be entered; and an electronic unit comprising a receiving surface on which said note book can be placed, a plurality of actuators associated with said respective relative positions when said note book is placed on the receiving surface . . . means, for indicating which page is exposed and means responsive to an output from said indicating means to associate said actuator with the respective data associated with the writing areas of the exposed page." This way the number of actuators (push-buttons) has been reduced, but there is additional operation to find the right page and also there is no feedback to show that the selected number is the desired one. In some telephones with autodialling memory the number is displayed on alpha-numeric display during its entry into memory and also during dialling, so it could be verified. Even it has been proposed in U.S. Pat. No. 4,341,929 to display in addition to a numerical telephone number, alphabetic characters representing the name of the individual associated with that telephone number. Thus both the name and the telephone number are stored and displayed. However, in this proposal, a separate alpha-numeric character keyboard is provided for the purpose of entering signals representing names.

SUMMARY OF THE INVENTION

The subject matter of the present invention relates generally to advanced use of the telephone directory in a telephone system for improved human interface and better access, retrieval and use of the data stored in this directory.

The telephone dialler according to the invention provides an easy and fast access to the stored telephone directory through repositionning of a single sliding or rotary control, which depending on its position causes the associated address generator to generate an address, used to retrieve the necessary telephone number and associated with it additional information. Moving this control permits easy scanning of the contents of the telephone directory memory and by displaying it on an alpha-numeric display easy location of the desired number. The depressing of another button performs the autodialling of the selected this way number.

In addition to the dialled number, additional alphanumeric information, like the name of the called person is displayed on the display thus permitting easy verification.

A standard telephone dialler keypad is used for entering the numbers and as well as the letters, but the keypad is allowed to enter alphabetic characters only during "name" programming mode and behaves in all other modes as a standard telephone dialling keypad.

In addition to the scanning mode, "shortcut" and "manual" modes are also available. The "shortcut" dialling means that just dialling the sequential number of the person to be called as it is stored in the telephone directory memory is enough. This feature is very useful for numbers, which are frequently used, and the caller knows their position numbers in telephone memory.

The keypad permits in "name" programming mode (the mode when the additional alphanumeric information is entered into telephone memory) to enter a full set of ASCII characters by multiple depressings of a button. For example for entering the letter "B" the button "2" on the keypad should be depressed 3 times in a row and then depressing the button "enter" will cause the ASCII code corresponding to this letter to be stored in memory. This way the need for an alpha-numeric keyboard with all its complexity and cost is avoided.

The ready availability of the additional alphanumeric information in telephone memory is not only indispensable in medium to large autodialling directories, for identification and verification purposes during dialling, but it also ensures such advanced features as "who is calling" information (service provided by some North American companies), if the telephone number of the caller exist in the directory not only the number is displayed but also the name of the caller, this last in combination with an answering machine could keep track for all incoming calls.

The application of this telephone system is also very convenient for use in such office automation and home automation equipment as fax machines etc.

EMBODIMENTS OF THE INVENTION

The embodiment of a telephone dialler according to the present invention includes a CPU which controls all telephone system periphery and performs all algorithms to implement the system, a nonvolatile memory for storing the telephone directory (could be EEPROM, Flash ROM, battery backed up RAM or any other in circuit programmable memory) and permitting easy modification of the data, a standard telephone like keypad (with small modifications explained later and made in order to accommodate the input of some additional characters), data character display (LCD or any other similar) for displaying the contents of the telephone directory and means for scanning the contents of the telephone directory on the display and direct dialling using the data displayed on the display.

BRIEF DESCRIPTION OF THE DRAWINGS

The block diagram of the whole system has been sown on FIG. 1, forming one embodiment of the invention.

On FIG. 2 is shown an embodiment of the Address Generator of the telephone system, based on a potentiometer connected to one of the inputs of an A to D converter. The outputs of the A to D converter are connected to the parallel inputs of a shift register performing normalization of the result and outputting it to a address generator output buffer (note, the shift register and the buffer could be implemented by software).

Figure 3:
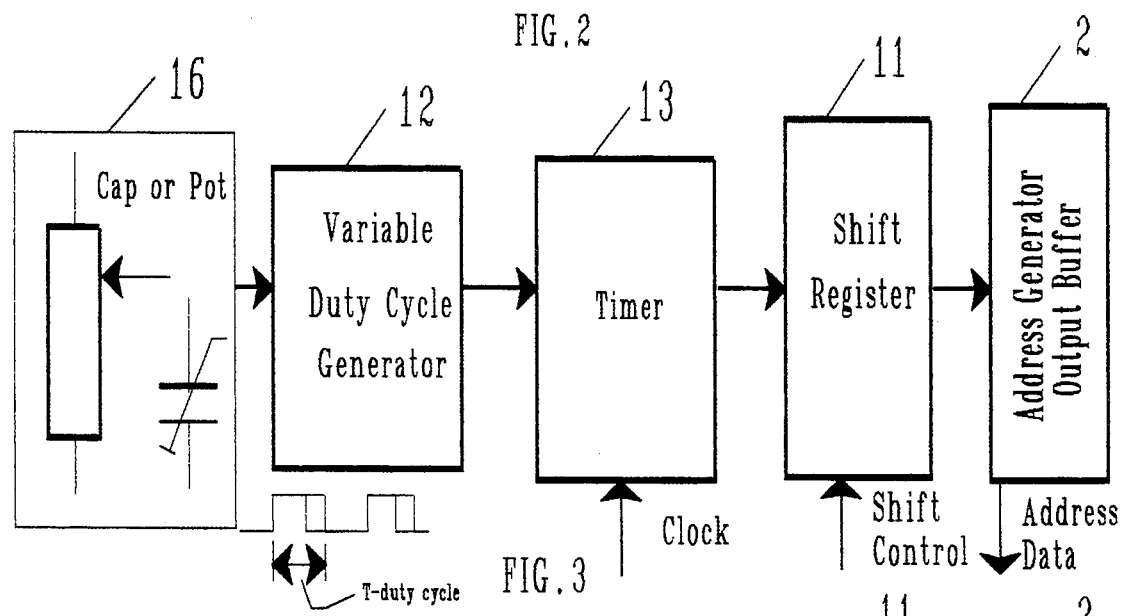

On FIG. 3 there is another embodiment of the Address Generator, based on a variable duty cycle generator and following it timer circuitry. The input controls change the generator duty cycle and the timer measures it and then transfers the result to a shift register for normalization and finally to a address generator output buffer (note again, the shift register and the temporary buffer could be implemented by software).

Figure 4:
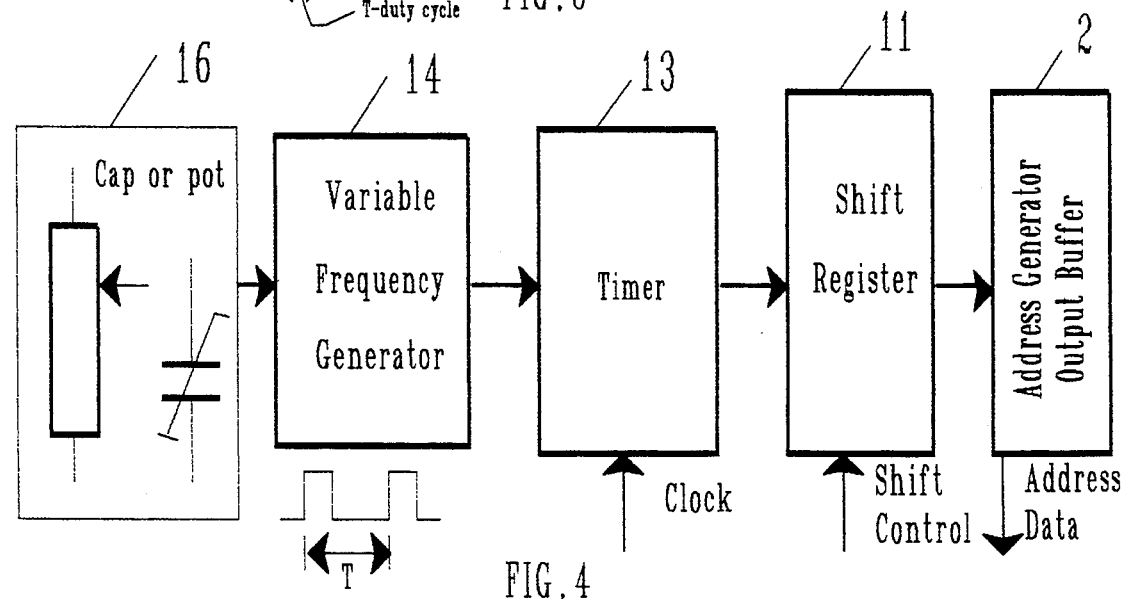

On FIG. 4 is shown yet another embodiment of the Address Generator based on a variable frequency generator and following it timer. The input controls vary the generator's frequency, which is then measured by the timer, normalized afterwards by a shift register and finally stored into a address generator output buffer (again the shift register and the temporary buffer could be accomplished by software).

Figure 5:
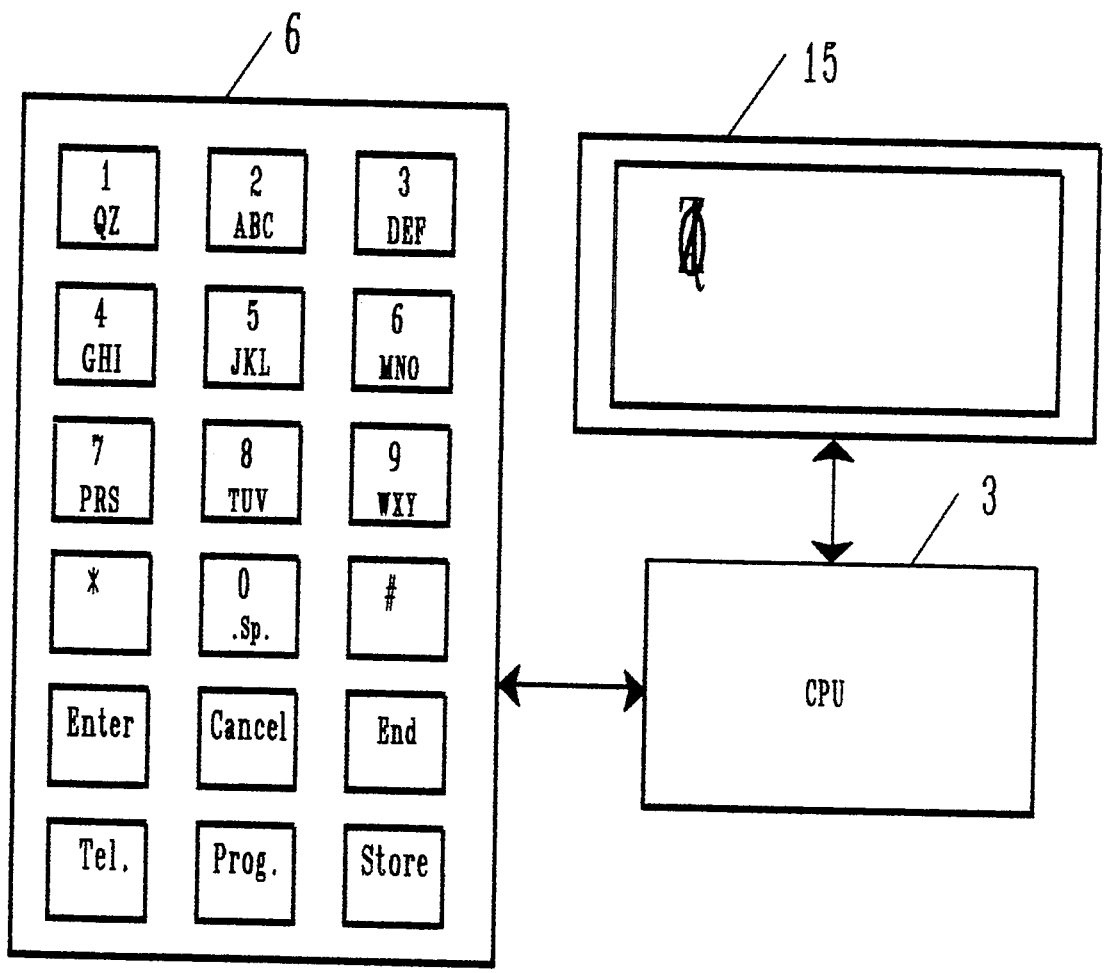

FIG. 5 shows the layout picture of the telephone system keypad, connected to the CPU and respectively the character display connected also to the CPU and displaying the result of three consequent depressings of the button "1" on the keypad. The consecutive characters are shown overlapped but actually at first depressing of "1" button an "1" will be displayed, at second depressing it will be replaced by "Q", at third—by "Z" and then the process will repeat until the button "enter" has been depressed, which will cause the current displayed character to be stored and the display cursor to move to the next position. The above sequence will be valid during entering the "name" information into the telephone directory memory. During normal dialling, shortcut dialling or entering the telephone number into directory the keypad behaves as a standard telephone keypad.

Figure 6:
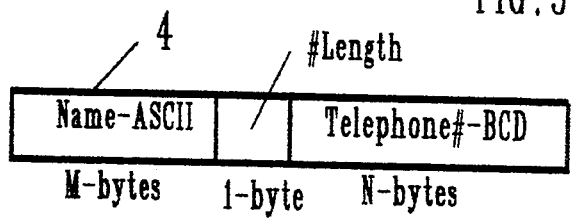

FIG. 6 shows an example of a structure of the telephone directory memory I/O buffer between the telephone directory and the CPU. As it could be seen the "name" is stored in ASCII code and the "length" of the telephone number and the telephone number itself- in Binary Coded Decimal (BCD) code. This is done in order to save memory space. The number, sequence and contents of the blocks comprising the telephone directory memory I/O buffer could be different depending on specific requirements to the system but should match the number and contents of the cells of the telephone directory.

Figure 7:
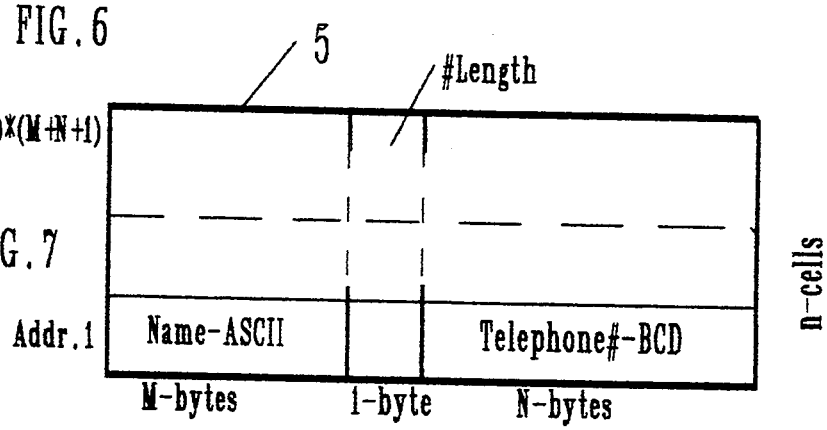

FIG. 7 shows an example of organization of the telephone directory. As it could be seen from this example the separate cells containing the name, telephone number and the length of the telephone number have equal length and should be in correspondence to the structure of the temporary buffer. This will make easier for the software to move the traffic both ways.

Figure 1:
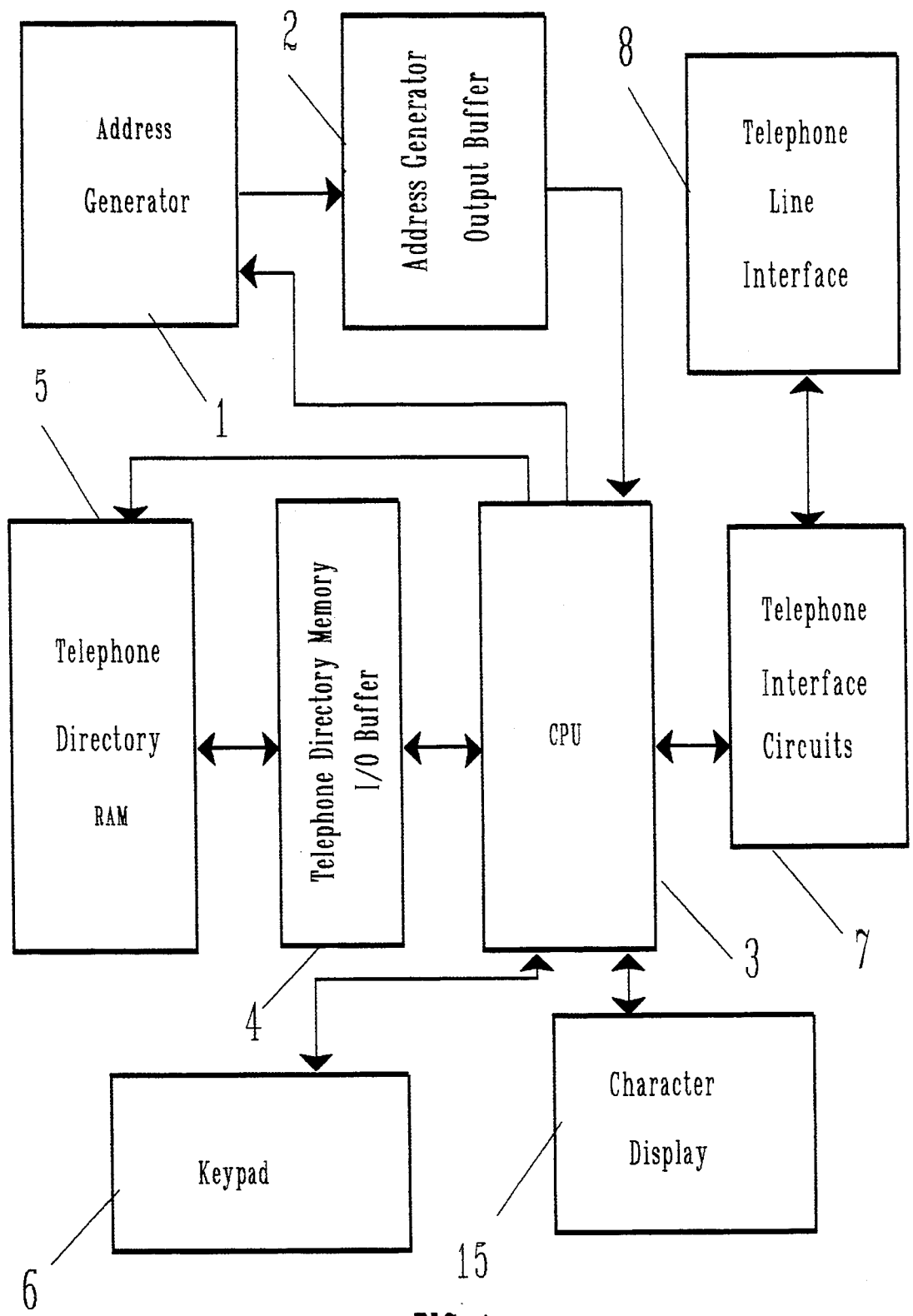

As shown on FIG. 1 the telephone system according to the present invention includes an address generator 1 connected to a address generator output buffer 2 on one side and receiving control signals from the CPU 3 on the other. The buffer 2 on its side is connected also to the CPU 3. The telephone directory RAN 5, which could be either a non volatile RAM, EEPROM or any other kind of non volatile memory permitting segment erasure and on line programmability, is connected with its I/O data bus to a telephone directory memory I/O buffer 4 and receives control and address data from the CPU 3, which on its side is connected to a standard telephone like keypad 6, an alpha-numeric display 15 of suitable size and type and to telephone interface circuits 7, such as tone dialler, ring detector, call progress detector, a standard telephone handset circuit plus the handset itself, a speakerphone circuit etc. The telephone interface circuits 7 on their side are connected to a suitable telephone line interface 8 such as telephone transformer and relay etc.

The system functions as follows: the address generator 1, which could have different embodiments explained later, but in all cases is controlled by a single sliding or rotary type control, generates depending on the position of the control an address or part of an address (could be simply the sequential order of a cell from telephone directory), which is stored in the address generator output buffer 2; after depressing the button "tel." on the keypad 6, the CPU 3 takes the address from the address generator output buffer 2, reads the corresponding cell from the telephone directory 5, which contains the telephone number and other identifying alpha-numeric data, moves this data into the temporary buffer 4 and then displays it in suitable form on the alpha-numeric display 15. This process is continuous but discrete in time, so moving or rotating the control of the address generator 1 modifies the address in buffer 2 and in discrete suitably chosen moments of time the CPU 3 takes this address reads the corresponding cell of the telephone directory 5, moves the data to the telephone directory memory I/O buffer 4 and display 15. This way just by moving the sliding or rotary control of the address generator 1 one could easily, fast and conveniently scan the contents of the telephone directory 5 on the display 15 keeping at the same time the currently displayed information into the telephone directory memory I/O buffer 4. If one presses in the mean time the button "tel." on the keypad 6 the displayed number is outputted by the CPU 3, from the telephone directory memory I/O buffer 4 to the telephone interface circuit 7 and from there through the telephone line interface 8 to the telephone exchange. A variation of the above described way for scanning of the telephone directory memory 5 is performed following way—after depressing the appropriate control button the keypad 6 is switched into "name" mode, described in the next pages, but only for the first entered alpha-numeric character, and after that by activating the sliding/rotary control of the address generator 1 only those numbers from the telephone directory memory 5 are displayed on display 15 and moved to telephone directory memory I/O buffer 4 for which the alpha-numeric supplementary data starts the selected letter. In case of an incoming call (if the option available) the system sends a request through the telephone interface circuits 7 and receives the calling party number which is stored in telephone directory memory I/O buffer 4 and then compared to the telephone numbers contained inside the telephone directory RAH 5 and if a match found all the additional information is concatenated to the number data inside the telephone directory memory I/O buffer 4 and displayed on to display 15.

Figure 2:
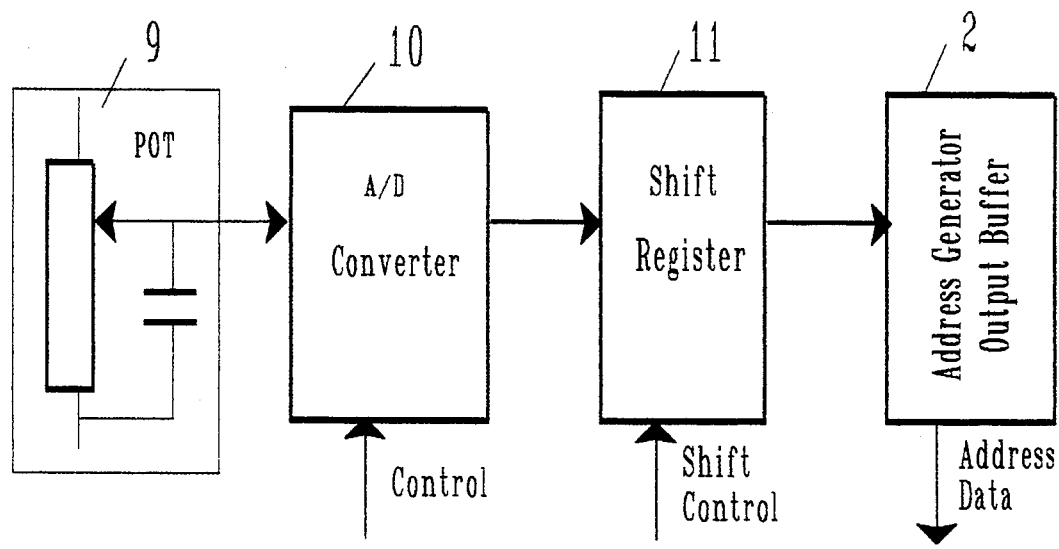

One possible embodiment of the address generator 1 is shown on FIG. 2. The variable voltage from the slider of the potentiometer 9 is fed to one of the inputs of the A to D converter 10 with a suitable resolution and accuracy. The transformed into digital code value of this voltage from the outputs of the A to D converter 10 is supplied to the parallel inputs of the shift register 11, where a logical shift right is executed under control of the CPU 3, depending on the A to D converter resolution 10 and the size of the telephone directory RAH 5. As an example if the A to D converter 10 has 8-bits resolution and the telephone directory RAN 5 has 16 cells, the data inside the shift register 11 will be shifted four bits to the right. After that from the outputs of the shift register 11 data is moved to the address generator output buffer 2 and is used further by the CPU 3 for generation of an effective address, adding it to the offset address of the telephone directory RAM 5, the CPU accesses a cell in the telephone directory RAM 5 which directly corresponds to a given position of the slider of the potentiometer 9, so, this way moving the slider causes the digit stored in address generator output buffer 2 to change in such a way that all addresses in telephone directory RAM 5 are scanned and a fixed given position of the potentiometer 9 corresponds always to a fixed cell inside telephone directory RAM 5.

Different embodiment of the address generator 1 is shown on FIG. 3. There a fixed frequency variable duty cycle generator 12 is controlled either by potentiometer or variable capacitor 16, which varies the duty cycle of the signal fed from its output to the input of a timer 13 measuring the width of the signal and loading the result to the parallel inputs of the shift register 11. The next steps are identical to that from FIG. 2. With a suitable choice of the duty cycle range and the frequency of the generator 12 and accordingly the resolution of the timer 13, this embodiment of the address generator I will meet any requirements regarding the size of the telephone directory RAM 5.

Third variation of the address generator 1 is shown on FIG. 4. Here the main difference from FIG. 3 is that the position of the controls 13 control a variable frequency generator 14 and the timer 13 is in period (frequency) mode of measurement. Here too by properly choosing the frequency range of the generator 14 and the resolution of the timer 13, a wide range of telephone RAM 5 could be reliably accessed.

FIG. 5 shows some particularities of the keypad 6 and the way the data is interpreted by the CPU 3 and displayed on the alpha-numeric display 15 during "name" programming mode, eliminating this way the need for an alpha-numeric keyboard. When in program mode to enter the name of the person, after first depressing of a given push button the keypad 6 output is interpreted by the CPU 3 as the digit marked on it, and it is displayed same way on the alpha-numeric display 15, second depressing of the same button is interpreted by the CPU 3 as the first character marked on the pushbutton bellow the digit and accordingly replaces the digit on the display 15 and its ASCII code is stored into telephone directory memory I/O buffer 4; third depressing is interpreted as the second character bellow the digit and next depressings of the same button are interpreted as next marked characters and after the last again the digit is displayed and so on until a designated "enter" button which could be any button not dedicated for entering of alphanumeric data on the keypad 6 leaves last character into telephone directory memory I/O buffer 4 and moves to next position for entering next character of the name till the depressing of the "end" button, the maximum allowed number of characters has been exceeded, or the button "cancel" has been depressed. In first two cases the mode automatically switches to entering the telephone number and already the keypad 6 is interpreted by the CPU 3 as a normal only digital keypad. Only the digits corresponding to the depressed buttons are displayed on the display 15 and accordingly their codes stored in telephone directory memory I/O buffer 4. In the third case the buffer 4 and the display 15 are cleared and the whole procedure starts from the very beginning. The entering of the telephone number is complete either after depressing the "end" button on the keypad 6 or exceeding the allowed length for the telephone part of the telephone directory memory I/O buffer 4. In both cases the "length" is automatically stored in the appropriate location in telephone directory memory I/O buffer 4. Next procedure is to depress the button "store" on the keypad 6 and the contents of the telephone directory memory I/O buffer 4 is automatically stored by the CPU to a cell in the telephone directory RAM 5, currently pointed by the address contained in the buffer 2. The only difference from the standard keypad is the addition in the new keypad 6 of letters "Q" and "Z" bellow number "1" and —"." and space "SP" bellow "0", which was necessary to make them also available for programming.

The structure of the buffer 4 is explained on FIG. 6. It should be noted that the "name" information is in ASCII code and the "length" of the telephone number and the telephone number itself in BCD in order to save memory space, but they could be of any other suitable type.

FIG. 7 shows the internal structure of the telephone directory RAM 5. Rows are cells and as is shown the n-th address is displaced from the first by $(n-1)*(H+N+1)$ bytes, where n—is the cell number; M—length of the "name" in bytes; N—length of the telephone number in bytes. So, the address increments from cell to cell by $H+N+1$ bytes. The structure of a row in telephone directory RAM 5 corresponds exactly to the structure of the telephone directory memory I/O buffer 4.

While, the above described embodiments of the invention are the preferred ones, it is apparent to those skilled in the art that many other changes and modifications may be made without departing from the invention in its broader aspects. Therefore the intention of the claims is to cover such changes and modifications falling within the true spirit and scope of the invention.

The embodiments of the invention in which an exclusive property or privilege is claimed are defined as follows:

1. A telephone dialler operable in a dialling mode to a dial a selected telephone number and in a programming mode to store a set of indicia comprising a telephone number and additional alphanumeric information in a telephone directory memory, said telephone dialler comprising a telephone keypad having a plurality of push buttons each of which is associated with a respective number and a respective set of alphabetic characters, a display and a central processing unit (CPU) to store and retrieve information from the memory, said keypad, display and CPU being connected and controlled by the firmware in such a way, that upon selection of the programming mode of operation said keypad is operable in one of two functions, one of said functions permitting entry of additional alphanumeric information another of said functions permitting entry of numerical only information, in said one function depression of the push buttons of the keypad are interpreted as follows: upon first depressing of a given push button a code representative for the marked on it number is stored in a temporary buffer, after each subsequent depressing of the same button, a code representing successive letters of the respective set is placed in the buffer and displayed at the same location, until after each letter of the set has been displayed the number will again be displayed, the alphanumeric character being entered in the buffer upon depression of a designated enter button, each successive alphanumeric character being entered in a similar way until termination of the entry of alphanumeric characters, and in said another function depressings of the push buttons enter codes corresponding to numbers associated therewith.

2. A telephone dialler as claimed in claim 1, wherein said memory includes a plurality of cells of the same structure and the data stored in a cell of the telephone directory memory and also in the telephone directory memory I/O buffer contains the telephone number and information about its length in Binary Coded Decimal and all other additional information is in ASCH code.

3. A telephone dialler as claimed in claim 1, wherein the entering of additional alphanumeric information repeats until the number of entered characters exceeds a certain predetermined value.

4. Telephone dialler as in claim 1, where the entering of additional alphanumeric information repeats until a predesignated enter button is depressed twice in succession without entering information.

5. Telephone dialler as in claim 1, where the entering of additional alphanumeric information repeats until a specially designated button for end of data is depressed.

6. A telephone dialler comprising a keypad to generate a sequence of indicia corresponding to a telephone number, a display to display a selected one of said sequences of indicia, a memory to store said sequences of indicia, to provide a telephone directory and a central processing until (CPU) to access said memory, and a manually openable address selection device to select one of said stored sequences of indicia, said selection device including an address generator output buffer to store a selected address value for subsequent transfer to the CPU's internal address register for access to telephone directory memory and an value generator to vary the selected value in the address generator output buffer, the change in selected value being proportional to the displacement of the selection device.

7. A telephone dialler as claimed in claim 6, wherein the manually operable address selection device comprises:

An analog to digital converter (ADC) connected with its input to a tap of a potentiometer connected between ground and a voltage reference to provide a variable input voltage to said ADC; digital outputs of the converter are connected to the inputs of the address generator output buffer, whose outputs communicate with said CPU, said converter receiving its control inputs from said Central Processing Unit.

8. Telephone dialler as claimed in claim 6, wherein the manually operable address selection device comprises:

A variable duty cycle generator connected on one side to a variation control element and on the other to a timer in duty cycle measurement mode of operation, connected with its output to said address generator output buffer, wherein the duty cycle of the generator can be manually varied and is measured at preselected constant intervals by the timer, the digital value from the output of the timer being fed into said address generator output buffer for further use as an address value by said CPU.

9. Telephone dialler as claimed in claim 6, wherein the manually operable address selection device comprises:

a variable frequency generator connected on one side to a variation control element having its outputs connected to a timer operating in frequency measurement mode, said timer being connected with its outputs to said address generator output buffer; the frequency of the generator being manually variable and being measured at preselected constant intervals by said timer; the digital value from the output of the timer being fed into said address generator output buffer for further use as an address value by the CPU.

10. A telephone dialler as claimed in claim 6, wherein if the combined length of the additional alpha-numeric data plus the corresponding telephone number is longer than the maximum length of the alpha-numeric display the displayed data is left justified starting with the alpha-numeric data and all digits in excess of the display length are truncated.

11. A telephone dialler, including a central processing unit (CPU), a telephone directory memory, an alphanumeric display and a calling party number decoding circuit, wherein the telephone number of the incoming call decoded by the calling party number decoding circuitry is stored in a buffer than compared by means of the Central Processing Unit with numbers stored in telephone directory memory and if match is found the additional data corresponding to this number is loaded by means of the CPU from the telephone directory memory into telephone directory memory I/O buffer and then the information is displayed on the alphanumeric display.

12. A dialler according to claim 1 wherein upon entry of the programming mode, the keypad is conditioned to operate in said one function and said other function is selected upon completion of entry of alphanumeric characters.

13. A dialler according to claim 12 wherein completion of the entry of alphanumeric characters is indicated by depression of predesignated button.

14. A dialler according to claim 12 wherein completion of entry is determined by the number of characters entered exceeding a predetermined value.

* * * * *

UNITED STATES PATENT AND TRADEMARK OFFICE
CERTIFICATE OF CORRECTION

PATENT NO. : 5,359,651
DATED : October 25, 1994
INVENTOR(S) : Georgi H. Draganoff It is certified that error appears in the above-indentified patent and that said Letters Patent is hereby corrected as shown below:

On the Title Page, item [54] and column 1, line 4, change "FEAURE" to --FEATURE--.

Column 7, line 18, change "ASCH" to --ASCII--.

Signed and Sealed this

Fourth Day of April, 1995

Attest:

BRUCE LEHMAN

*Attesting Officer*   *Commissioner of Patents and Trademarks*